E. W. LABOMBARDE.
BOX MAKING MACHINE.
APPLICATION FILED JAN. 26, 1906.
960,348.
Patented June 7, 1910.
10 SHEETS—SHEET 1.
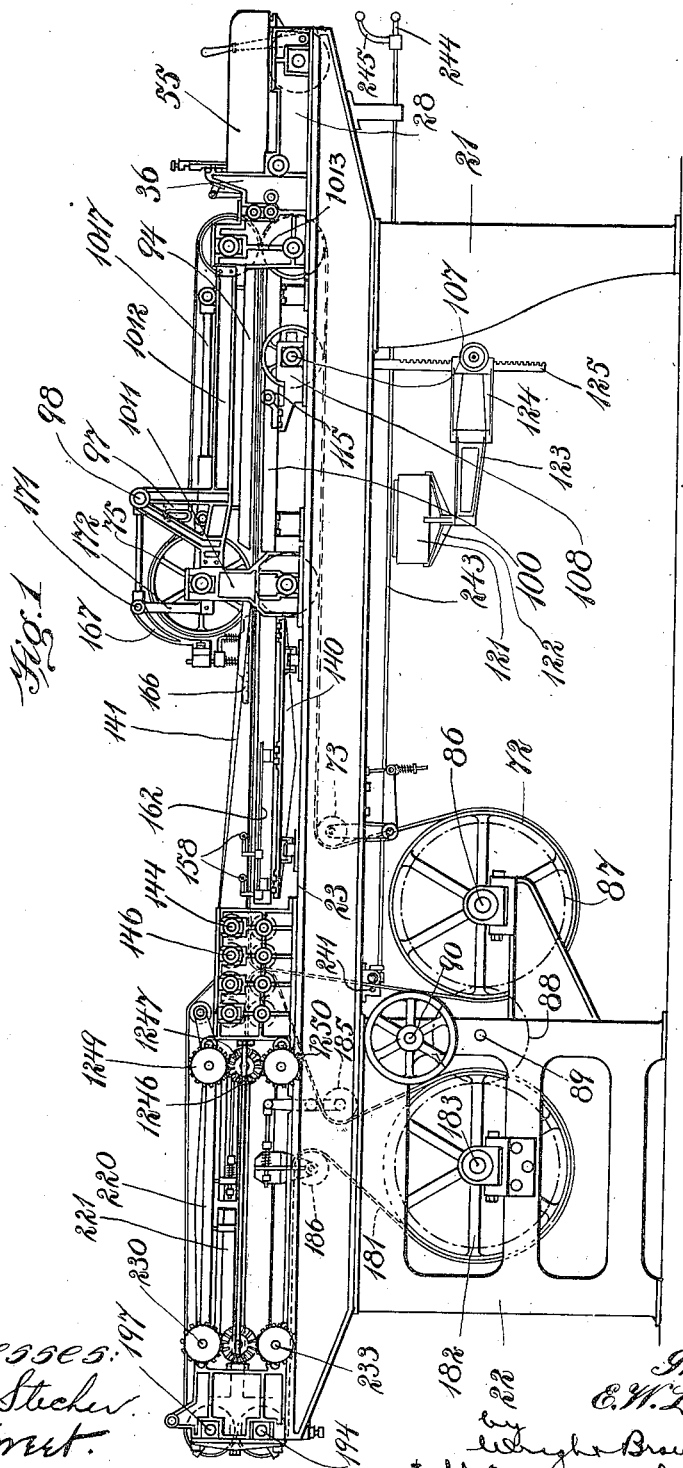

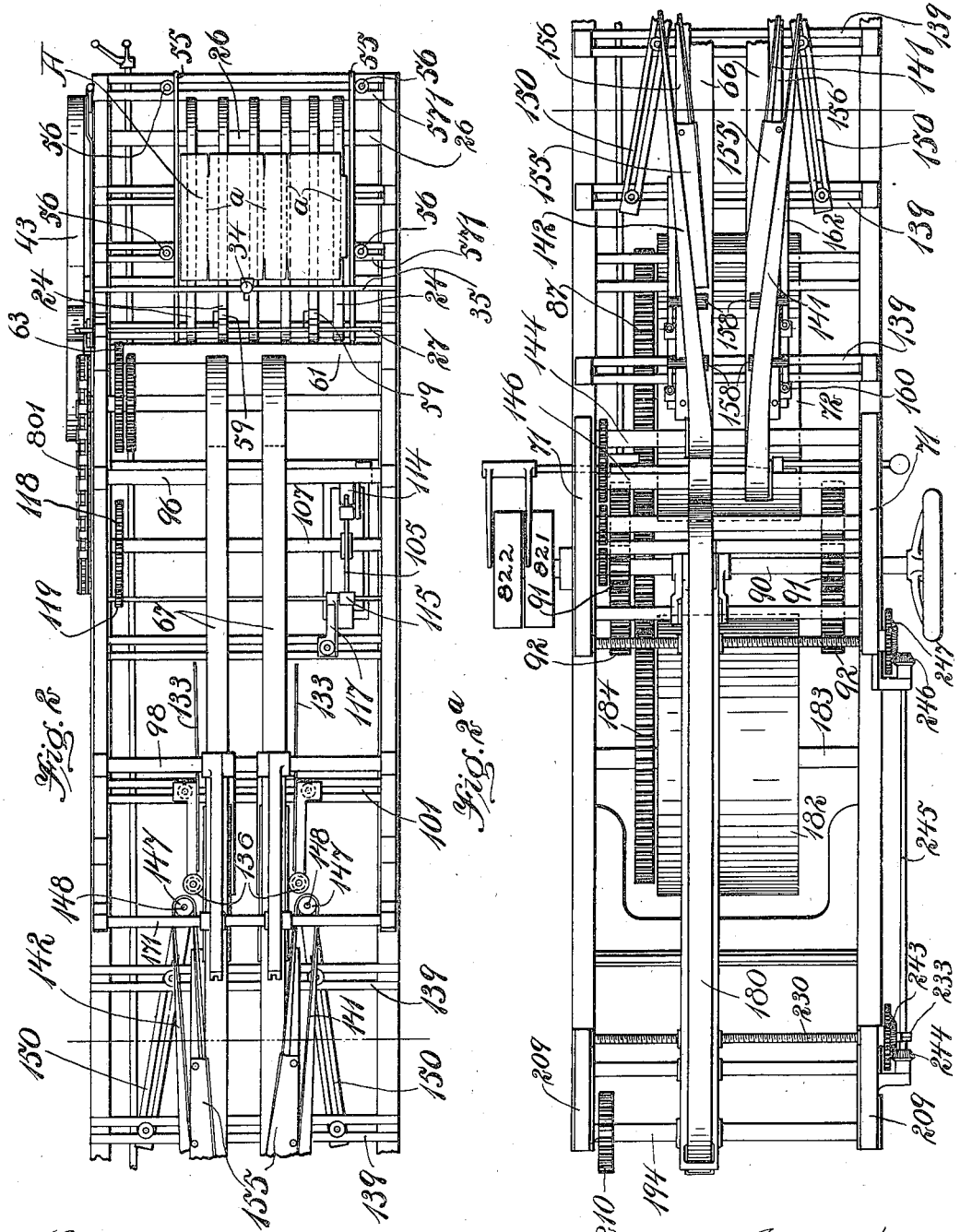

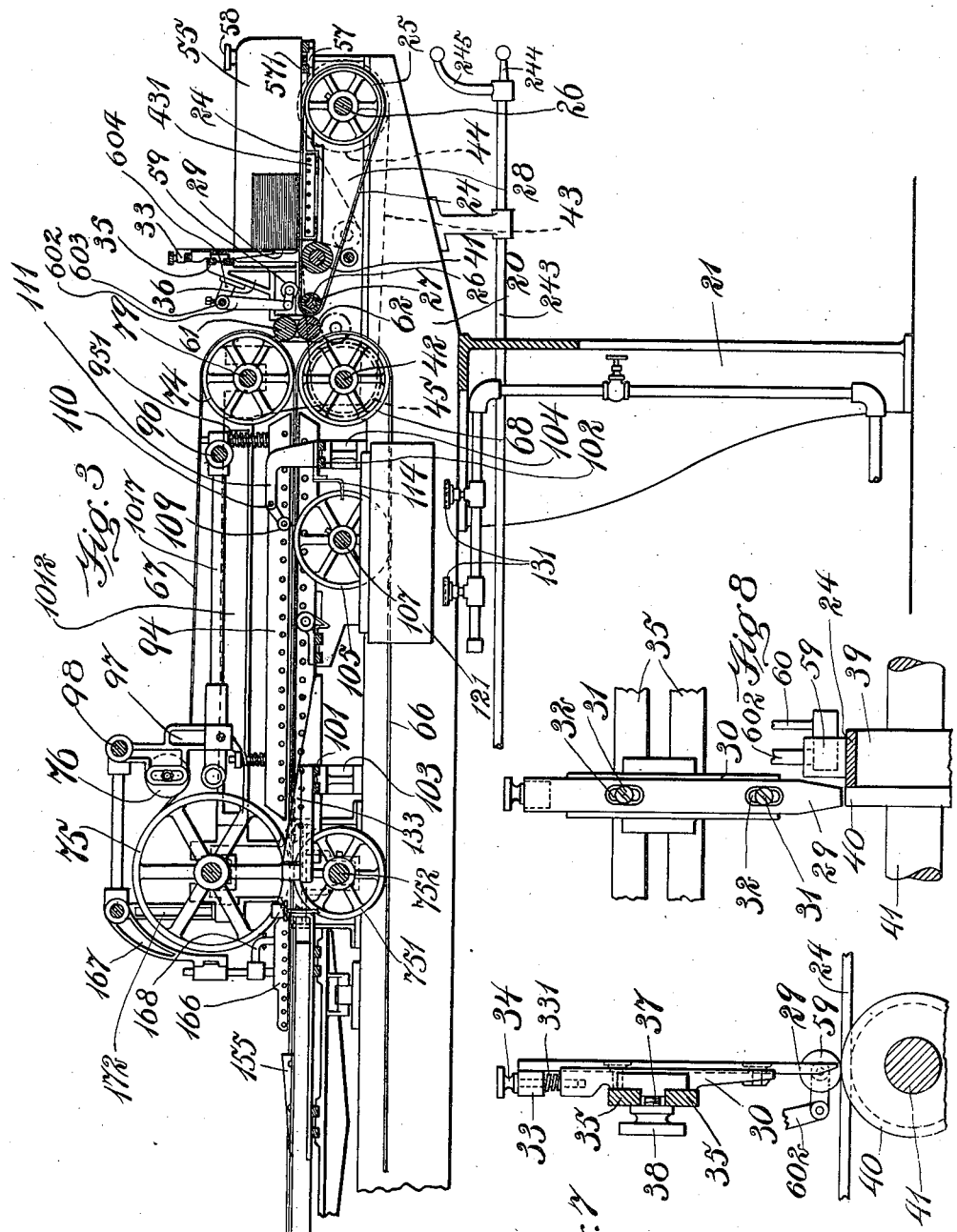

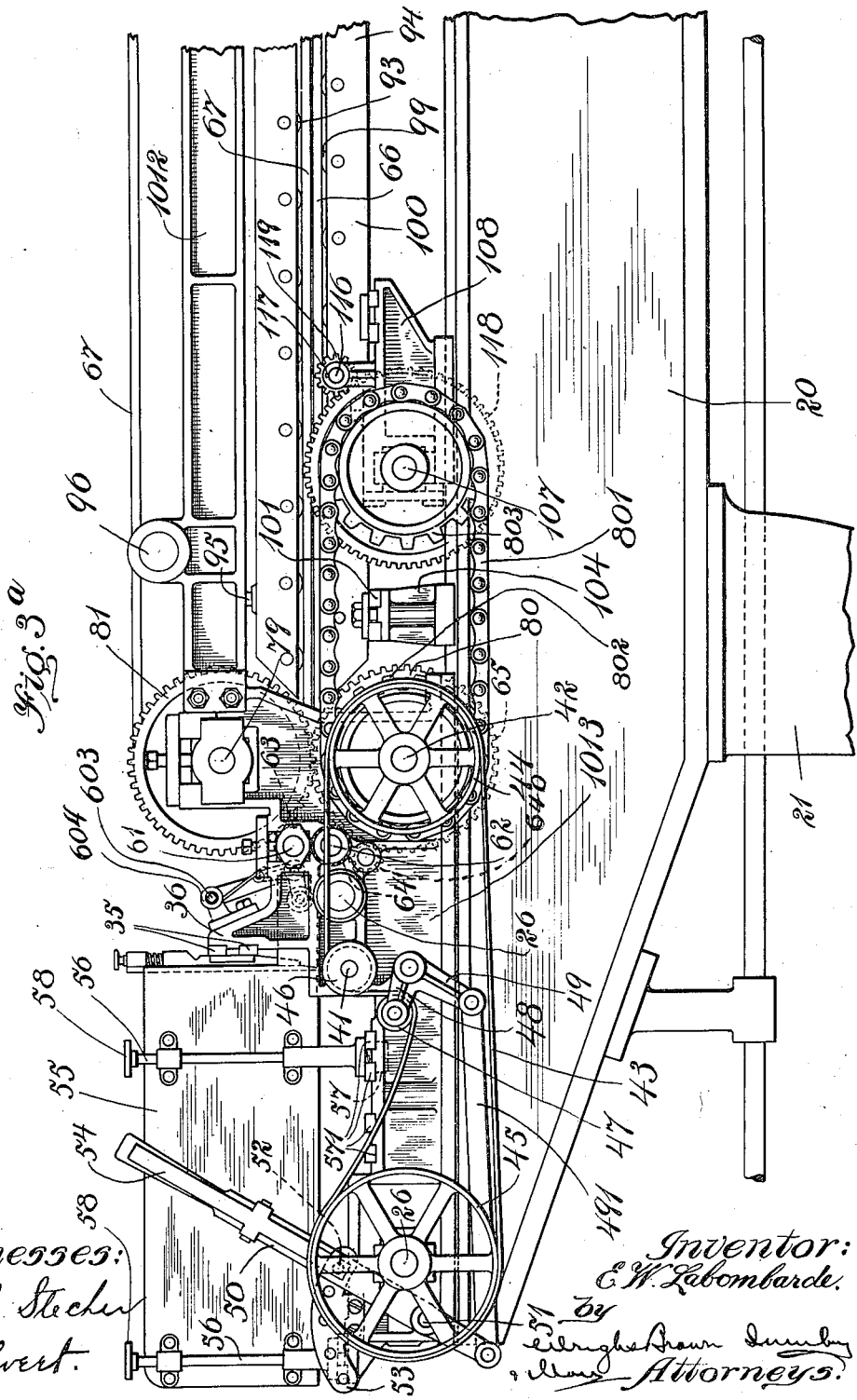

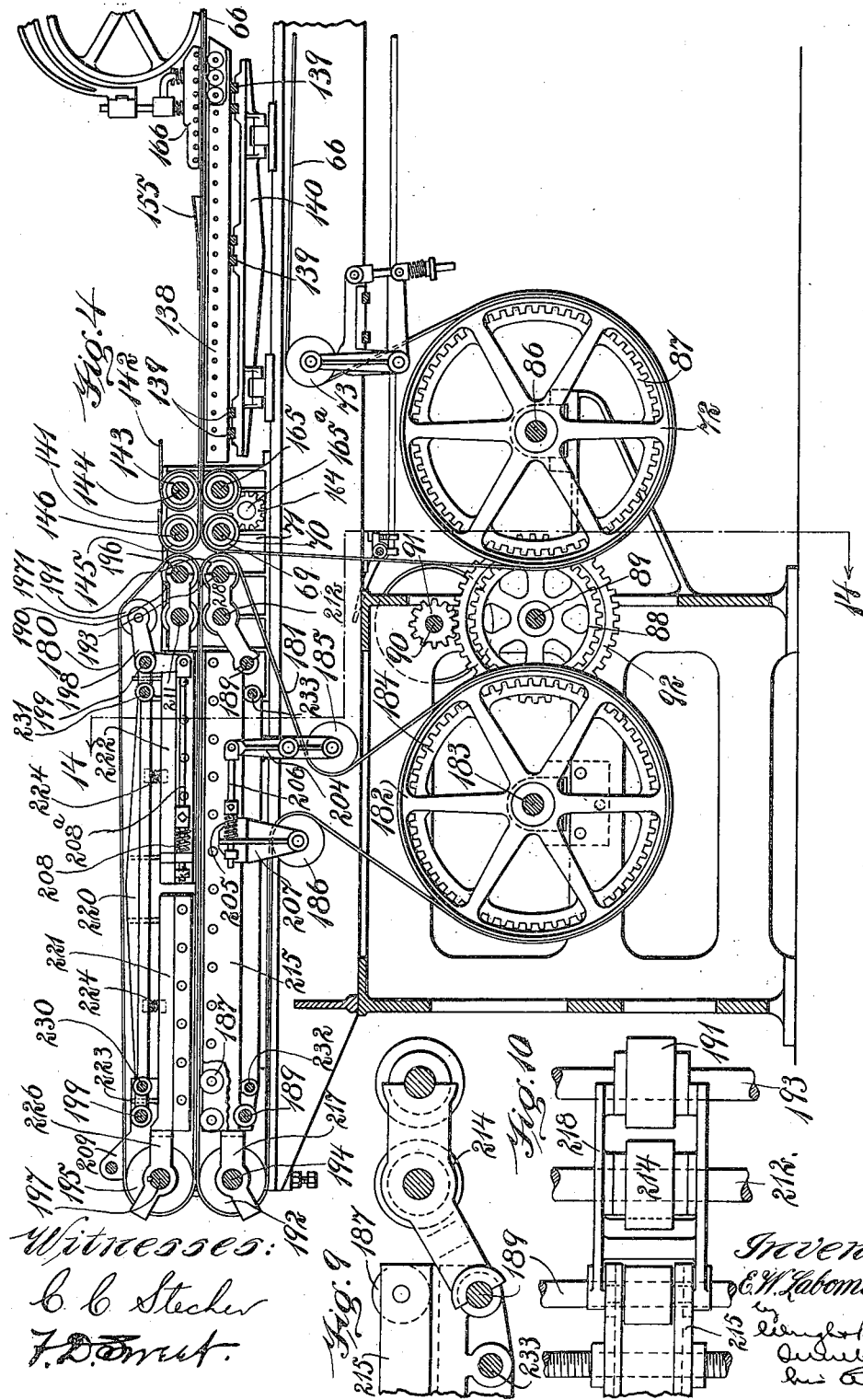

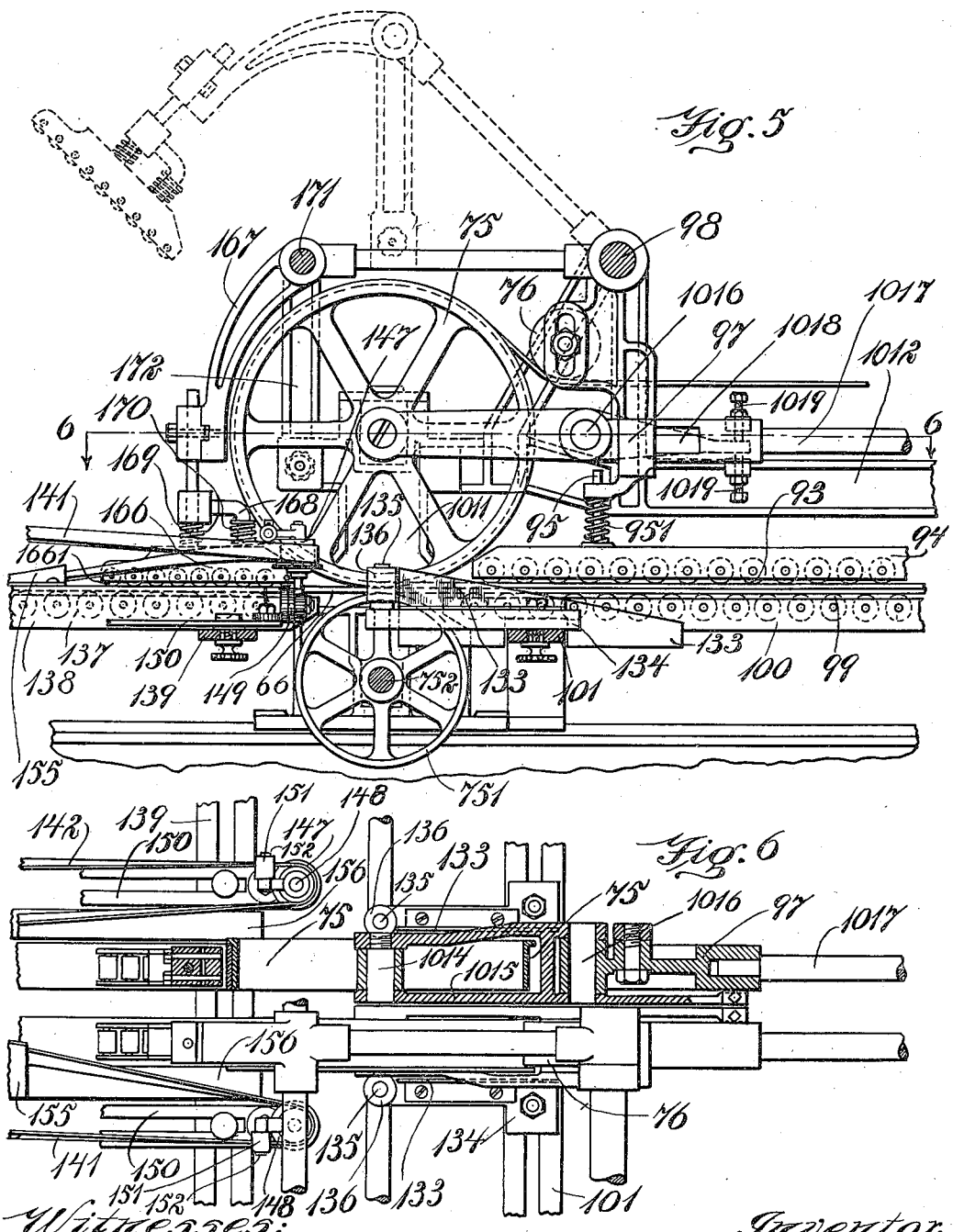

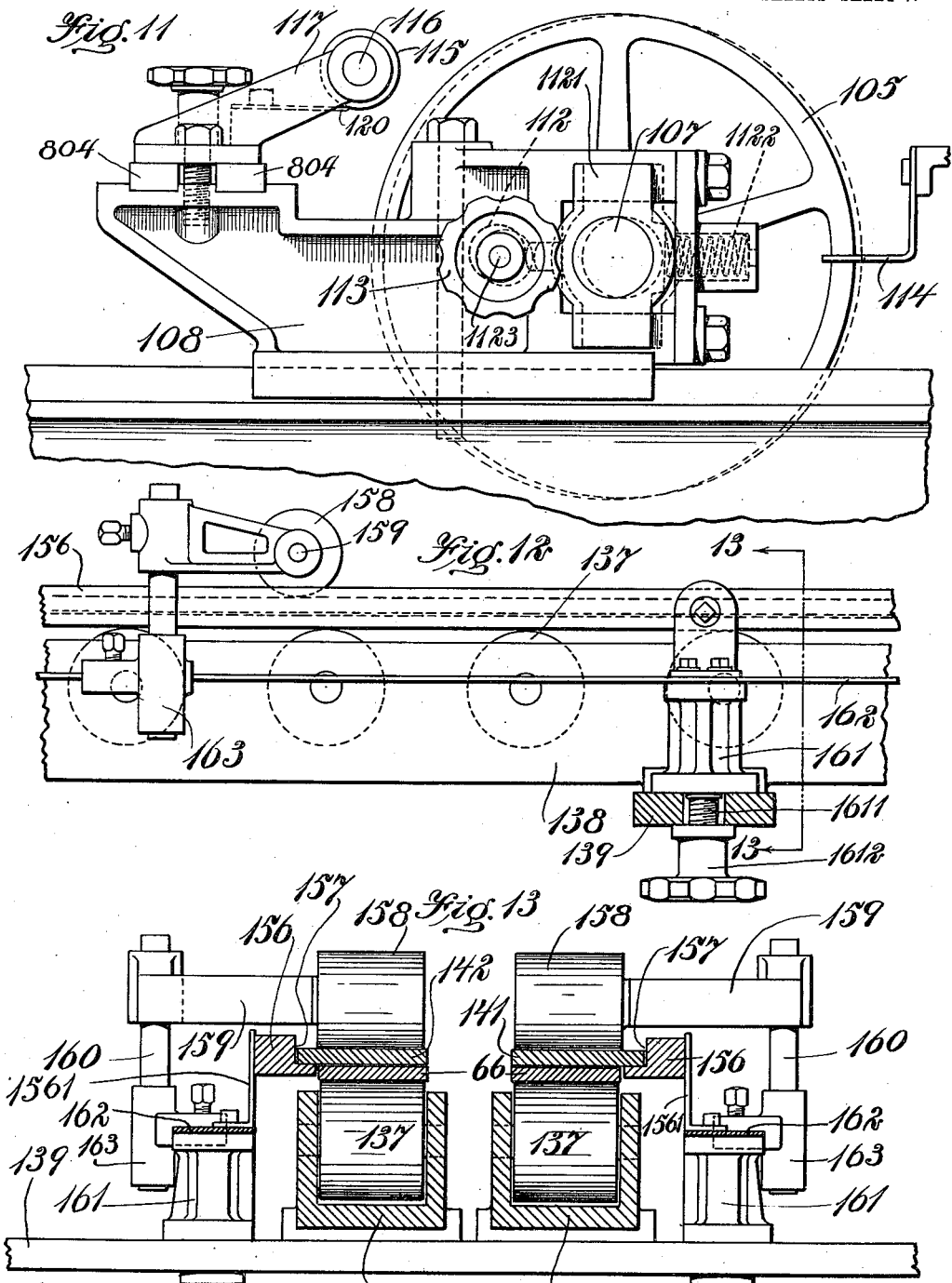

E. W. LABOMBARDE.
BOX MAKING MACHINE.
APPLICATION FILED JAN. 26, 1906.
960,348.
Patented June 7, 1910.
10 SHEETS—SHEET 8.
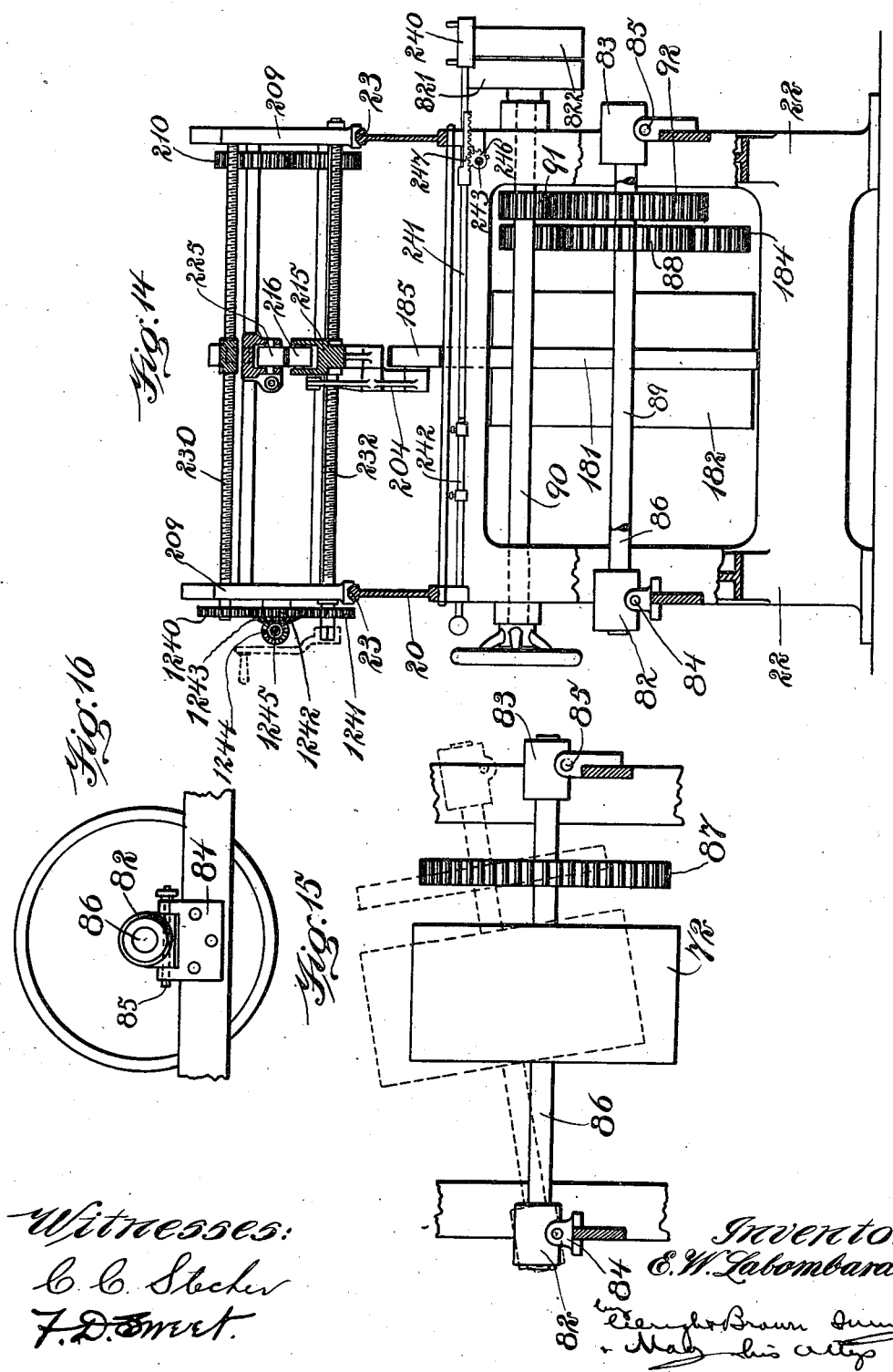

E. W. LABOMBARDE.
BOX MAKING MACHINE.
APPLICATION FILED JAN. 26, 1906.
960,348.
Patented June 7, 1910.
10 SHEETS—SHEET 9.
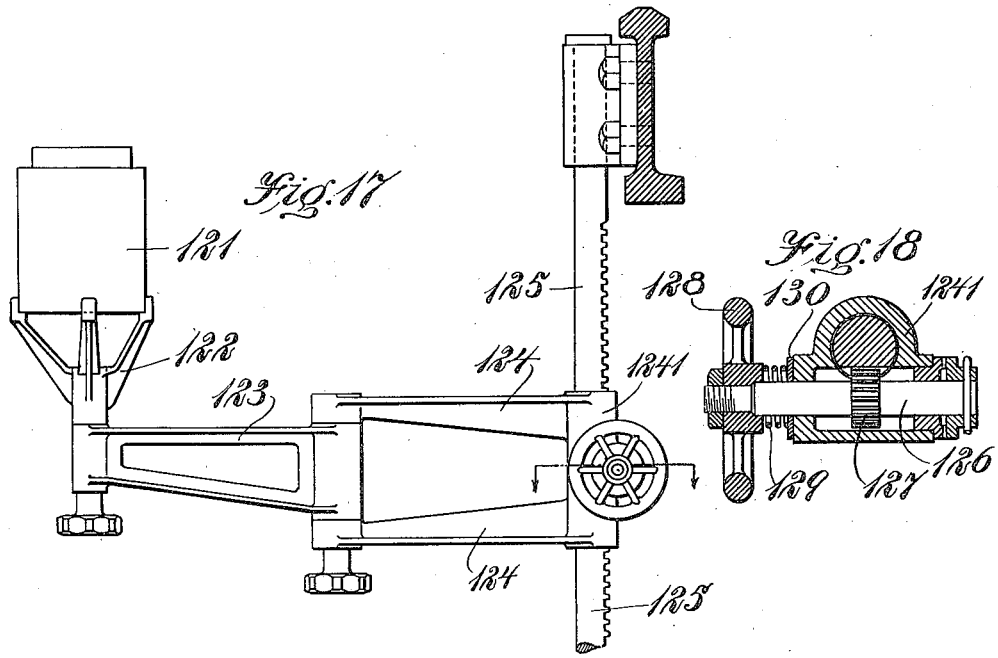
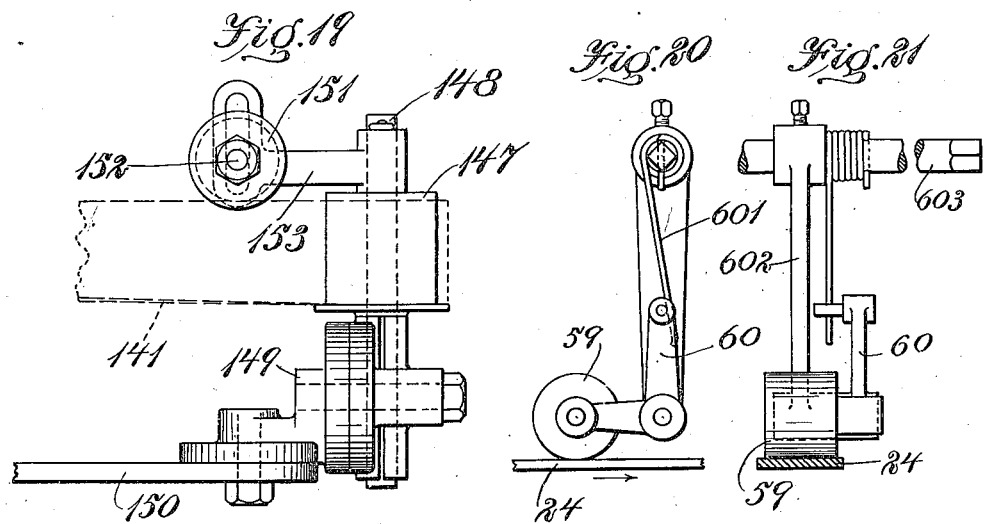
Witnesses:
C. C. Stecher
F. D. Sweet
Inventor:
E. W. Labombarde
by Wright Brown Quinby & May
Attorneys E. W. LABOMBARDE.
BOX MAKING MACHINE.
APPLICATION FILED JAN. 26, 1906.
960,348.
Patented June 7, 1910.
10 SHEETS—SHEET 10.
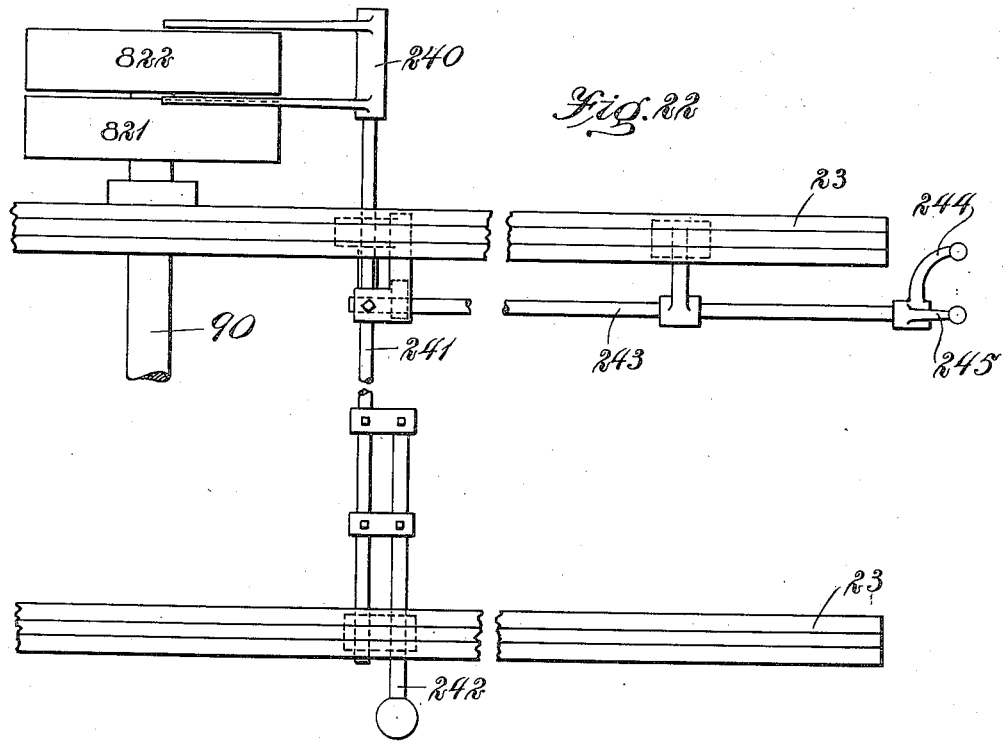
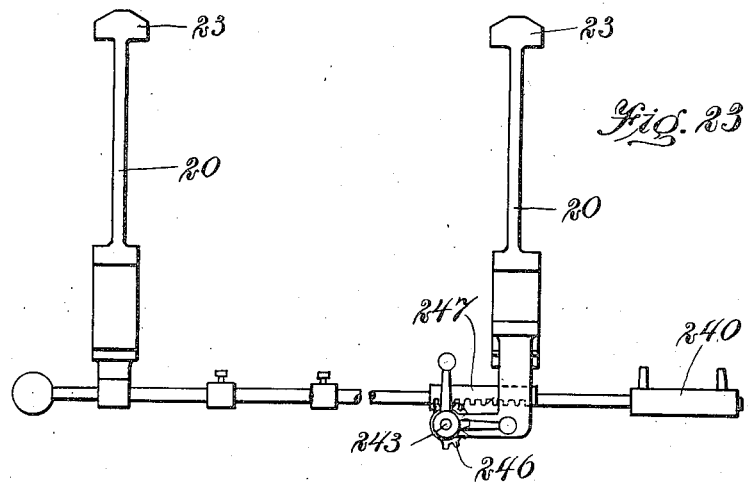

UNITED STATES PATENT OFFICE.

ELIE W. LABOMBARDE, OF NASHUA, NEW HAMPSHIRE.

BOX-MAKING MACHINE.

960,348.  Specification of Letters Patent.  Patented June 7, 1910.

Application filed January 26, 1906. Serial No. 297,971.

*To all whom it may concern:*

Be it known that I, ELIE W. LABOMBARDE, of Nashua, in the county of Hillsboro and State of New Hampshire, have invented certain new and useful Improvements in Box-Making Machines, of which the following is a specification.

This invention has relation to box-making machinery in which previously-scored blanks are coated with glue and the flaps folded one upon another so that their glued edges may be caused to adhere.

The object of the invention is to provide certain improvements in machines of the character mentioned for increasing their rapidity of operation and enhancing their efficiency.

The invention has further for its object to provide such machines with improved mechanism capable of manufacturing boxes of various widths by an adjustment of the parts.

It has further for its object the provision of such improvements as will insure the passage of blanks through the machine with accuracy whereby they will be properly folded along their scored lines and discharged from the machine without imperfections.

Referring to the accompanying drawings,—Figure 1 represents in front elevation a machine embodying the invention. Figs. 2 and 2ª represent an enlarged plan view of the machine, Fig. 2 representing one end thereof and Fig. 2ª the other end thereof. Fig. 3 represents a vertical section through that portion of the machine illustrated in Fig. 2. Fig. 3ª represents a rear elevation of the same, somewhat enlarged. Fig. 4 represents a longitudinal section through that part of the machine shown in Fig. 2ª. Fig. 5 represents an enlarged section through the middle portion of the machine, and illustrates another arrangement for mounting the wheels at the end of the upper conveyers. Fig. 6 represents a section on the line 6—6 of Fig. 5. Figs. 7 and 8 represent the means for effecting the feeding of a single blank. Figs. 9 and 10 represent details which are embodied in the delivery end of the machine. Fig. 11 represents the glue or paste-wheel and the parts immediately adjacent thereto. Fig. 12 illustrates the guide for one of the twist belts. Fig. 13 represents a section on the line 13—13 of Fig. 12. Fig. 14 represents a section on the line 14—14 of Fig. 4. Figs. 15 and 16 illustrate the means for mounting the belt-driving drum or cylinder. Figs. 17 and 18 illustrate the means for adjustably supporting the glue tank or receptacle. Fig. 19 represents in detail the means for mounting one of the belts. Figs. 20 and 21 represent the spring-tensioned presser-wheels that are employed in connection with the feeding mechanism. Figs. 22 and 23 illustrate the belt-shifting mechanism for the machine.

The machine consists of the following instrumentalities, to wit:—mechanism for feeding the detached or separate blanks successively; mechanism for gluing the edge of one of the flaps of each blank; mechanism for elevating the flaps so as to cause them to lie at a substantially right angle to the body of the blank; carrying mechanism for receiving each blank from the feeding mechanism, carrying it by the gluing mechanism and the flap-elevating mechanism, and finally delivering it to the pressing mechanism; mechanism for folding down the flaps with the edge of one flap resting against the edge of the other flap; and mechanism for pressing the folded and glued edges together and delivering the box from the machine.

The machine is provided with a relatively long bed 20, resting upon standards 21 22 and having parallel ways or shears 23 upon which the superstructure of the machine is adjustably placed.

*Feeding mechanism.*—The feeding mechanism is placed at the right end of the machine. It consists of a plurality of endless belts 24 whose upper stretches are in a substantially horizontal plane. These belts extend around wheels 25 secured adjustably upon a cross-shaft 26, the bearings of which are adjustable by means not illustrated in detail. Said belts 24 are likewise passed around an elongated roll 27. The belts or carriers support the pile of blanks which is placed upon them as shown in Fig. 3, and they successively feed the lowest blanks in the pile, as will be explained. The shaft 26 and the roll 27 are journaled in a frame 28 which is adjustably supported upon the ways or shears 23 of the bed, power being applied to the shaft 26 by mechanism which will be subsequently described. In order that the blanks may be fed one by one, an abutment consisting of a finger 29 is arranged to extend vertically upward from the plane of the top stretches of the belts, (see Figs. 7 and 8.) This finger is placed slidingly in a grooved support 30 and is connected thereto by screws 31 passed through slots 32 in said finger. The upper end of the finger has a projection 33, through which an adjusting screw 34 is passed into the upper end of the support. A spring 331 is interposed between the end of the support and the said projection 33 to raise the finger when the screw is reversely rotated. The support itself is secured to a transverse slotted bar, or two parallel bars, 35, supported at the ends by uprights 36 rising from the frame 28. The said support 30 is provided with a screw 37 which projects through the slot in the bar and upon which is placed a milled nut 38 whereby the support may be adjustably attached to the bar 35 at any point between its ends. Immediately below the finger 29 is a roll 39 having a flange 40 separated from the end of the finger by a space slightly thicker than the end of the blank, but small enough to prevent the passage of two blanks. The roll is adjustably secured upon a shaft 41, journaled in bearings in the frame 28. The said shaft has placed upon it a plurality of adjustable rolls, each roll lying under the upper stretch of one of the belts 24, to prevent it from sagging under the weight of the pile of blanks. The number of the belts varies in accordance with the width of the blanks which are to be made into boxes. When blanks which are from 18 inches to 2 feet in width are passed through the machine, there may be eight of such belts, although their number may be varied to suit requirements. When blanks less in width are to be passed through the machine, the belts and their supporting wheels are all moved closer together, or some of them removed. The roll-carrying shaft 41 and the shaft 26 are both driven by power from the shaft 42 by an endless belt 43 passing around pulleys 44 45. The shaft 42 receives power from the main driving shaft of the machine, as will be subsequently explained. The shaft 41 is provided with a pulley 46 over which the belt 43 passes, the belt being engaged therewith by a belt-tightener pulley 47 on the shorter arm 48 of a bell-crank. The longer arm 49 of the bell-crank projects downward, and is connected by a rod 491 with a hand lever 50 fulcrumed at 51, (see Fig. 3ᵃ.) By throwing the handle forward, the belt-tightener pulley is moved to a position to loosen the belt 43 so that it will slip upon the pulley 44 and stop the rotation of the shafts 26 and 41. This stops the belts 24 so that a pile of blanks may be placed upon them and properly assembled, while the rest of the machine is running, without the blanks being fed to the main-carrying mechanism. The said hand-lever 50 may be locked in either of several positions by means of a locking pin 52 adapted to enter apertures in a segmental plate 53 connected to the rear side of the framework 28, said pin being withdrawn when desired by a small lever 54 pivoted upon the hand-lever 50.

For the purpose of maintaining the pile of blanks in position, upright side guide-boards 55 55 are utilized. These guide-boards are supported upon upright posts or standards 56, the bases of which rest upon transverse slotted guide-bars 571. The said posts 56 are passed rotatively through the bases, and are threaded at their lower ends to receive nuts 57 by which they may be clamped to the said cross-bars. The upper ends of the said posts are provided with small hand-wheels 58, by means of which they may be easily rotated. The guide-boards 55 are by this means adjustably secured upon the cross-bars and they may be moved toward or from each other for the purpose of accommodating blanks of different widths. Upon the said cross-bars 571 are supported U-shaped frames 431 equal in number to the belts 24, in which are journaled rolls to prevent the sagging of the said belts 24. In order that the said belts 24 may insure the feeding of the blanks, they are preferably formed of textile material covered or coated with some suitable compound to cause them to frictionally engage the blanks and feed the lowest blank in the pile.

Above each of the carrier-belts there is placed a spring-tensioned roller 59,(see Figs. 3, 20 and 21,) by which each blank, as it passes the finger 29, may be grasped yieldingly against the belt. These rolls are loosely journaled upon bell-cranks 60, with which are engaged springs 601 to hold the rolls against the carriers. The said bell-cranks are pivoted upon arms 602 secured to a shaft 603, the ends of which are secured in projections 604 attached to the uprights or standards 36. The rollers 59 are adjustable toward and from the finger 29, the arms 602 being adjustable about the shaft 603 for this purpose, so that said rolls may be caused to lie close to the finger as shown in Fig. 7, or away from the finger as shown in Fig. 3. The rollers 59 coact with the finger and the carriers in effecting the rapid and successive feeding of the blanks, operating in such case as combing devices or combing rolls. After the blank leaves the belts 24 of the feeding mechanism, it enters between two rolls 61 62 which are journaled in the framework, the upper roll 61 being pressed yieldingly downward by springs, (not shown), which bear upon the journals thereof. These rolls are geared together by pinions 63 64, the lower pinion 64 intermeshing with an idle pinion 640 (see Fig. 3ᵃ) which is in mesh with a driving gear 65 on the shaft 42, to which reference has been previously made. These rolls grip the blank with yielding pressure and present it to the main carriers which carry the blank from the feeding mechanism to the pressing mechanism.

By the employment of a series of belts for supporting the pile of blanks, it is evident that each bottom blank rests throughout its entire length upon the surface of said belts, which are thereby enabled to get a much greater frictional grip upon it to feed it under the finger or abutment, than if the blank rested upon the periphery of a roll and was thereby engaged by a single line of contact. The belts insure the feeding of the blanks in such quick succession that very little space separates the left-hand end of one blank from the right-hand end of the preceding blank.

*Main carrying mechanism.*—The main carrying-mechanism of the machine consists of two lower belts 66 66 and two upper belts 67 67, each upper belt being immediately above one of the lower belts, so that the two may grip a blank between them, and hold it against twisting, and the two co-acting pairs being adjustable toward and from each other, to accommodate blanks of different widths. The two lower belts 66 extend from wheels 68 on the shaft 42 (see Fig. 3) forward to two small pulleys 69 69 on a shaft 70 journaled in an upright frame 71 on the bed (see Fig. 4). Thence the belts pass downward and around a large driving-drum 72; thence upward and over an adjacent spring-tensioned pulley or belt-tightener 73, and back to the pulleys 68. The upper belts 67 pass from pulleys 74 on a shaft 79 directly above that at 42, forward and around larger pulleys 75, and then backward beneath adjustable belt-tighteners or idlers 76. The pulleys 75 may be secured upon a shaft loosely journaled at its ends in bearings afforded by boxes vertically adjustable in brackets or uprights 1011 longitudinally adjustable upon the bed, as illustrated in Fig. 1. These uprights or brackets are connected by brace-bars 1012 with the uprights or brackets 1013 in which the shafts 42 and 79 are journaled. In some instances, however, it is preferred to journal the wheels 75 upon a stud-shaft 1014 secured in arms 1015, (see Figs. 5 and 6,) pivoted at 1016 to a bracket 97 depending from a cross-bar 98. To each bracket is secured a radius-bar 1017, the other end of which is attached to a cross-bar 96. The arms 1015 have fingers 1018 which may be adjusted by set-screws 1019 to swing the arms 1015 about their pivot 1016, and thus adjust the wheels 75 up and down with relation to the lower carrier-belts 66.

The shaft 42 is driven by the carrier-belts, but the employment of a main driving-belt has been contemplated which would follow a course similar to that of the carriers 66. The shaft 42 is geared to the shaft 79 by pinions 80 81 which are similar in size so that the two shafts are caused to rotate in unison, and thereby effect a synchronous forward movement of the contacting stretches of the carriers 66 67.

The pulleys for the carriers 66 67 are all adjustable longitudinally of their shafts for the purpose of adjusting the carriers themselves. The shaft 86 for the large driving drum 72 is journaled in bearing-boxes indicated at 82 83 in Figs. 15 and 16. One box 82 is pivoted in a bracket 84, whereas the other box 83 is secured in place by a screw 85 which, when removed, permits the drum to be tilted upward to facilitate the placing of the carriers 66 thereon. Secured to the drum-shaft 86 is a gear 87 with which intermeshes a gear 88 on a shaft 89 journaled on the standard 22, (see Fig. 4.) Power is imparted to this shaft 89 from the main-driving shaft 90 by a pinion 91 and gear 92.

The main driving-shaft is provided with fast and loose pulleys 821 822, mechanism being employed for shifting the driving-belt, as will be subsequently explained. In order that the opposing stretches of the main-carrying belts 66 67 may be caused to contact, so as to firmly grip the blank between them, a plurality of small loose rolls is employed. The rolls 93 which bear against the upper surface of the lower stretch of the upper belt are journaled in an inverted U-shaped frame 94, having parallel side-bars, as shown in Fig. 5, said frame being supported at each end by a depending post 95 and pressed downwardly by springs 951. At the right-hand end, the posts 95 are adjustably supported by a cross-bar 96, whereas at the left end, the said bars are supported by the depending bracket 97 which is as stated adjustable upon the cross-bar 98. These roller-supporting frames are adjustable toward and from each other, so that they may be always located in proper relation to the carriers. The depending brackets 97 are utilized to support the belt-tightener rolls 76 hereinbefore referred to.

The series of rolls 99 which support the upper stretches of the lower belts 66 are journaled in U-shaped frames 100 which are adjustably secured to slotted cross-bars 101 102, whose ends are secured to brackets or standards 103 104 placed adjustably upon the shears or ways of the bed. As each blank leaves the feeding mechanism it is gripped by the upper and lower carrying-belts 67 66 and carried forward without danger of its becoming dislocated during its forward movement, the loose rolls serving to press the said carrier-belts yieldingly together, without frictionally retarding said carrier belts or causing them to slip upon their pulleys.

*Gluing mechanism.*—As each blank is carried forward by the carriers, the edge of one of the flaps is coated with glue or suitable paste by a gluing or pasting wheel 105, which extends into a glue tank or receptacle, (see Figs. 3 and 11). The said wheel is adjustably secured upon a cross-shaft 107, journaled in suitable bearings in the standard 108 and is driven by a chain 801 and sprocket-wheels 802 803 from the shaft 42, (see Fig. 3ª). The flap is caused to engage the wheel by a loose roll 109 journaled on a stud-shaft 110, supported by an arm 111. The said arm is adjustable on the cross-bar 102, whereas the roll 109 may be adjusted toward and from the glue-pasting wheel 105. For the purpose of preventing surplus glue being deposited upon the flap, a stripper 114 is supported upon the cross-bar 102. Its end is bifurcated to straddle the wheel. In order that the amount of glue deposited may be varied in accordance with the requirements of the case, the glue-wheel 105 is adjusted toward and from the stripper. The adjustment is secured by a cam 112 engaging a projection on the journal 1121 in which the shaft 107 is mounted, said journal being held against the eccentric by a spring 1122. The eccentric 112 is formed on a shaft 1123 journaled in the bracket 108 and having upon its end a hand-wheel 113. Usually after a blank leaves the glue-wheel, it pulls a fine thread of glue along with it, which might subsequently tend to coat some of the operative parts of the machine, and consequently mechanism is provided for breaking such thread. This breaking mechanism consists of a roll 115 secured upon a shaft 116 which is journaled in bearings 117 adjustable on a cross-bar 804. Said shaft is driven at a very high speed from the shaft 107, by means of a large gear 118 and a pinion 119, (see Fig. 3ª). A knife 120 is arranged tangential to the roll 115 so as to strip the glue from the roll and cause it to drop back into the glue-pot.

The glue-pot itself is indicated at 121. It is supported upon a frame 122 (Fig. 17) rotatably adjustable in the end of an arm 123 which is itself rotatably adjustable in the end of an arm 124. (For the purpose of illustrating the glue-pot and its supporting devices, it is illustrated in Fig. 1 out of operative relation to the glue-wheel, but it will be understood that, when the machine is in use, the pot is in the position shown in Fig. 3.) The said arm 124 projects from the hub 1241, adjustably supported by an upright support or rack-bar 125, as shown in Fig. 17. The hub of the arm 124 is chambered to receive a shaft 126 and pinion 127, the latter intermeshing with the rack 125 (Fig. 18). The shaft has on its projecting end a hand-wheel 128 and is held normally against rotation by a spring 129 and a friction-washer 130. By means of the devices thus described, the glue-pot may be adjusted to any desired position, and may be swung from under the bed for the reception of a fresh supply of glue.

Any suitable means may be utilized for keeping the glue hot, as, for instance, the gas burner indicated at 131 in Fig. 3.

*Flap elevating and breaking mechanism.*—It has been stated that prior to passing the blanks through the machine they are scored. In Fig. 2, the blank is indicated at A, and the scored lines at *a*. As the blanks are being carried forward by the carrier belts 66 67, the flaps are first bent upward into vertical position by inclines 133 (see Fig. 5). These inclines are formed of thin sheet-metal, and they are adjustably attached to supports 134 which are likewise adjustably secured to the slotted cross-bars 101. The inclines may be set at any desired angle with reference to the path of the blank, and as the blank rides over them its flaps are raised toward a substantially vertical position.

Upon the supports 134 are upright pins 135 upon which are loosely journaled rolls 136. When small boxes are to be made, these rolls are set close to the wheels 75 and coact therewith in effectively breaking the blank along the scored line thereof, but when larger boxes are being made, the rolls are separated from the wheels, as shown in Fig. 2, as they are not then needed. Where the breakers 136 are utilized to break the blank along its scored lines in the manufacture of small boxes, there is placed below each of the wheels 75 a wheel 751. These wheels are adjustably mounted upon the shaft 752. The wheels 75 are flanged at their ends to assist in breaking the blanks, and they coact with the said wheels 751.

For folding down the upturned flaps of the blanks, so that the glued edge of one flap may be engaged with the edge of the other flap, the following mechanism is employed: Below the upper stretches of the belts 66 66 are placed a series of rolls 137, (see Figs. 5, 12 and 13). These rolls support the belts, or carriers, and prevent them from sagging. They are journaled in frames 138 which are U-shaped in cross-section, said frames being adjustably supported by slotted cross-bars 139, the ends of which are secured to longitudinal supports 140 attached to the ways or shears upon the bed of the machine. In juxtaposition to the belts or carriers 66 66 are folding belts 141 142. The belt 142 is passed around a flanged roll 143 on the shaft 144, (see Figs. 2ª and 4,) whereas the belt 141 is passed around a roll 145 on a shaft 146. The shaft 146 is directly above the shaft 70 hereinbefore referred to. The said belts 141 142 are passed around idlers 147 journaled on pins or stud-shafts 148, each of which is connected by an adjustable universal joint 149 with a slotted support 150 adjustably connected with the slotted cross-bars 139 by suitable bolts or fastening means, (see Figs. 2, 2ª and 19.) Each universal joint 149 is so constructed that the stud-shaft 148 may be held at any desired angle and secured thereat. To the upper end of each stud-shaft is attached an arm 153 having in its end a slot in which is adjustably secured a stud-shaft 152 upon which is journaled a flanged roll 151 which bears against the upper edge of the belt 141 or 142, as the case may be, and prevents it from rising or leaving the roll 145. As the inner stretches of the belts 141 142 pass from the pulleys 147 to the pulleys 143 145, they are passed under and guided toward a horizontal position by guides 155 attached to longitudinal bars 156 adjustably supported by brackets 1561 upon longitudinal strips 162 which rest upon posts or uprights 161. The said posts or uprights are provided with depending screws 1611 which extend through the slots in the cross-bars 139 for the reception of clamping nuts 1612 by which the posts or standards 161 are adjustably secured in any desired position. The said longitudinal bars 156 are rabbeted or formed with right angled grooves 157 on their inner edges, (see Fig. 13,) to receive the outer edges of the lower stretches of the twist belts 141 142 so as to hold them firmly against lateral and downward movement. The guides 155 and the rabbeted or longitudinal bars 156 coact in guiding the inner and lower stretches of the folding belts 141 142 from a substantially vertical position to a substantially horizontal position, so that a flap under either of the belts will be folded from an upright to a prone position while at the same time it is gripped and being carried along by the carriers 141 and 142 and the carriers 66 since the carriers all move in unison, as will be subsequently explained. The pulleys 147, as shown in Fig. 2, are set close to the ends of the elevating inclines 133. As the blanks are fed along by the carriers, the flap upon the edge of which the glue is placed is laid down first and then the other flap is laid upon it. To effect an initial pressure upon the two flaps to effectively fold them along their scored lines, the lower stretches of the belt 141 or 142 are pressed against the carrier-belt 66 by small rolls 158 which are loosely journaled upon horizontal stud-shafts 159 adjustably secured to the posts 160. The said posts are mounted in supports 163 adjustably secured upon the longitudinal strips 162, as illustrated in Figs. 12 and 13.

The driving-shafts 144 146 for the belts are geared to the shafts 165 and 70 immediately below them and the two lower shafts 165 and 70 are geared together by a gear 164 on a stud-shaft 165ª. These gears are all the same size and as the shaft 70 is driven by the driving-drum 72, it will be seen that the belts 141 142 are caused to move in unison or synchronously with the carriers or belts 66 66.

For the purpose of holding the blank upon the carrier-belts from the time it passes under the belts 67 and until it is gripped by the folding belts 141 142, shoes 166 are employed as illustrated in Figs. 4 and 5. Each shoe consists of a small frame in which are loosely journaled rolls 1661. These shoes are held in place by arms 167 pivoted upon the cross-shaft 98 hereinbefore referred to and longitudinally adjustable thereon. Each shoe is engaged by two downwardly projecting pins 168 169 and is held yieldingly downward by springs 170. The said pins 168 169 are adjustable with relation to the arm 167 and may be secured in place after adjustment by any suitable means. Between their ends the arms 167 are attached to a cross-bar 171 supported by uprights 172, the lower ends of which are secured to the uprights 1011. The arms 167 are, as stated, adjustable transversely of the machine, so that the shoes may be caused to register with the carrier-belts when the latter have been adjusted.

*Box pressing mechanism.*—The mechanism for effecting the pressing together of the glued flaps will now be described. It consists of two coacting belts, of which 180 is the upper and 181 is the lower, as shown in Figs. 2ª, 4 and 14. The lower belt 181 is passed around a drum or cylinder 182 upon a shaft 183. The said shaft is mounted in bearings similar to those in which the shaft 86 is journaled. It is connected with the intermediate shaft 89 by a gear 184, intermeshing with a gear 88. The lower belt 181 passes from the drum 182 around a belt-tightener pulley 185, over a pulley 191 slidingly keyed on a shaft 193, thence in a horizontal direction to a pulley 192 slidingly keyed on a shaft 194, and thence over a belt-tightener pulley 186 to the drum. The belt-tightener pulley 185 is journaled in an intermediately-fulcrumed lever 204 against which tension is exerted by a spring 205 acting through a rod 206. The belt-tightener pulley 186 is journaled in a bracket 207. The upper belt 180 passes around a belt-pulley 195 directly above that at 192 and keyed slidingly upon a shaft 197. Thence said belt passes under and around a pulley 190 on a shaft 196 and up and over a belt-tightener pulley 1971. Said belt-tightener pulley 1971 is journaled in the end of an arm 198 of a bell-crank, fulcrumed upon a cross-bar 199. Against the depending arm of said bell-crank, tension is exerted by a spring 208 acting through a rod 208ª. The two shafts 194 and 197 are journaled in bearing-brackets 209, placed upon the bed and they are geared together by gears 210. In parallelism with the shafts 193 196 are two additional shafts 211 212, upon which rolls 213 214, are slidingly keyed. The shafts 211 and 212, and the shafts 196 and 193 respectively are all geared together whereby they are caused to rotate in the proper direction in unison, the gearing, however, not being illustrated in detail. The rolls 191 and 190, 213 and 214, and 195 and 192 are, as stated, keyed upon their respective shafts, so as to slide thereon; and they are all caused to move in unison transversely with relation to the machine by adjusting mechanism which will be described.

Arranged across the machine are the round cross-bars 189 189, 199 199, upon which are supported roll-carrying frames for causing the opposing stretches of the belts 180 and 181 to make yielding contact one with the other. The lower frame is indicated at 215, as shown in Fig. 14. This frame is substantially U-shaped in section and in it are journaled loose rolls 216 upon which rests the upper stretch of the carrier-belt 181. Projecting from the left-hand end of this frame 215 is a yoke 217 which embraces the belt-pulley 192 and projecting from the right hand end of said frame is a yoke 218, (see Fig. 10,) which embraces the belt-pulleys 214 and 191 on the shafts 212 and 193 respectively. These yokes, together with the frame, maintain the rolls and the various pulleys in proper alinement to receive the belt, and since the belt-tighteners 186 and 185 are supported upon the said frame 215, as illustrated in Fig. 4, it is apparent that the lateral adjustment of the frame effects a lateral adjustment of the pulleys upon their shafts and of the belt 181 with relation to the cylinder or drum 182. The upper frame consists of a support 220, the ends of which are mounted to slide upon the cross-bars 199 199. Below the support are two inverted U-shaped frames 221 222, each of which is provided with dowel-pins 223 projecting upwardly and loosely through apertures in the said support 220. Springs 224 are interposed between the inverted U-shaped frames and the support 220, so as to hold said frames downwardly with yielding pressure, whereby the blank carried between the frames by the carrier-belts 181 and 180 will be subjected to a practically continuous pressure to cause the glued flaps to firmly adhere. In each of the frames 221 222 are journaled loose rolls 225 similar to those at 215. In the end of the frame 221 is a yoke 226 embracing the pulley 195, and in the end of the frame 222 is a yoke 227, similar to that at 218 embracing the pulleys 213 and 190 on the shafts 211 and 196 respectively.

Mechanism is provided for effecting a synchronous adjustment of the roll-carrying frames transversely with relation to the machine. This mechanism consists of screw-rods 230 231 for the upper support 220 and similar screw-rods 232 and 233 for the lower frame, said support and frame being provided with internally-threaded apertures to receive said rods. The ends of the screw-rods are smooth and are journaled in the bearing-brackets 209, the forwardly projecting end 232$^a$ of the screw-rod 232 being squared or angular, as indicated in Fig. 14. On the end of the screw-rods 231 233 are placed gears 1240 and 1241 respectively, which intermesh with an interposed gear 1242. The last-mentioned gear is formed with a bevel gear 1243 which intermeshes with a bevel-gear 1244 on a longitudinal shaft 1245. On its other end the said shaft is provided with a bevel-gear 1246 intermeshing with a bevel-gear 1247 formed on a gear 1248 which intermeshes with and drives two gears 1249 and 1250 on the screw-rods 231 233 respectively. By applying a crank to the squared end 232$^a$ of the screw-rod 232, said rod may be rotated in either direction, with a simultaneous and synchronous rotation of all of the other screw-rods to effect a lateral adjustment of the belts 180 and 181 and their supporting and pressing pulleys and rolls.

*Belt shipping mechanism.*—Mechanism is provided by means of which the driving-belt for the machine may be shipped by the operator from either the feeding end of the machine or from the front, this shipping mechanism being illustrated in detail in Figs. 22 and 23. The belt-shipper fork is indicated at 240 and it is secured upon a longitudinally movable rod 241. To this rod is attached a handle 242 which projects forward beyond the front upright portion of the bed, where it may be easily grasped by the operator and pulled forward or pushed rearward to effect the shipping of the belt in one direction or the other. The rod 241 and the handle 242 are mounted in brackets depending from the bed. Extending from the rod 241 to a point at the extreme right hand end of the bed is a rock-shaft 243 having at its extremity two handles 244 and 245. On its inner end the said rod is provided with a pinion 246 engaging a rack 247 on the rod 241. By rocking the shaft 243 in one direction or the other, the rod 241 may be moved forward or rearward, as the case may be, to ship the belt from the pulley 821 to the pulley 822, and vice versa.

*Operation.*—The operation of the machine has been explained in detail, but it may be summarized as follows:—The blanks A are placed in a pile upon the carrier-belts 24 with their ends resting against the finger 29. As the said carrier-belts 24 move forward they carry with them the lowest blank in the pile which as it passes under the finger is pressed against them by the rolls 59 until it reaches the power-driven rolls 61 62. These rolls feed the blank from the feeding belts to the carrier-belts 66 67. The last-mentioned carrier-belts grasp the blank firmly between them and carry it forward to the glue-wheel 105 which places along the under edge of the front flap a line of cement or glue, the flap being held from rising at this time by the roll 109. As the blank proceeds, the string of glue which is drawn from the glue-wheel by the flap is broken by the rapidly-rotating wheel 115. The blank proceeds with the carriers until it engages the elevating inclines 133, whereupon the flaps are elevated from a prone to an upright position, and are broken along their scored lines. As soon as the breaking occurs, the blank passes from beneath the carrier-belt 67, but is pressed against the carrier belts 66 by the roll-carrying shoe 166 until it is gripped by the folding belts which move in unison with the carrier-belts 66. The folding belts coact with the carriers 66 in carrying the blank forward but at the same time they fold down the two upright flaps, the forward flap being folded first and the other flap being folded down upon it so that the glued edge is caused to engage the extremity of the other flap. The two flaps are pressed together by the coacting belts until the blank passes between the rolls on the shafts 144 146 70 and 165. Then it is engaged by the belts 181 180 which are adjusted in position so that they are in alinement with the overlapping edges of the folded flaps. These belts carry the blank forward and as their contacting stretches are held yieldingly together by the series of rolls, the contacting edges of the flaps are pressed together sufficiently so that when it is delivered at the left end of the machine, the flaps will still continue to adhere without danger of separating.

The machine is designed to run at a high speed and to feed the box-blanks through the machine, one following the other closely, and consequently many thousands of boxes may be folded and glued in the course of a day.

Having thus explained the nature of the invention, and described a way of constructing and using the same, although without attempting to set forth all of the forms in which it may be made, or all of the modes of its use, I declare that what I claim is:—

1. In a machine of the character described, the combination with a lower carrier comprising a pair of lower belts having upper horizontal stretches to engage a blank and means for actuating said belts, of an upper carrier comprising a pair of upper pressers extending partway of the length of the horizontal stretches of the lower belts and directly above the upper stretches of the lower belts, flap-elevating inclines arranged adjacent the outside edges of said belts, folding-belts beyond the upper pressers arranged to overlap the said lower carrier to fold down the flaps of the blanks elevated by said inclines, and shoes for pressing the blanks against the lower belts, said shoes extending from the upper pressers to the folding-belts, said pressers, belts, and shoes being laterally adjustable to accommodate blanks of greatly varying widths.

2. In a machine of the character described, the combination of a lower carrier, flap folding belts, a horizontal pulley for each of said belts lying across said lower carrier, an upstanding pulley for each belt outside the said lower carrier, the belts extending around said pulleys, stud shafts for said upstanding pulleys and universally adjustable supports for said stud shafts whereby the angles of said shafts relatively to the carrier and their distances from the center thereof may be varied.

3. In a machine of the character described, the combination of a lower carrier, flap-folding means comprising two belts, a horizontal pulley for each of said belts lying across said lower carrier, an upstanding pulley for each belt outside the said lower carrier, universally adjustable stud shafts for said upstanding pulleys, and other pulleys as at 151 on said shafts bearing against the upper edges of said belts.

4. In a machine of the character described, a blank carrying mechanism comprising a lower endless belt, pulleys for supporting and actuating it, an upper endless belt, pulleys for supporting and actuating said upper belt, one of the last-mentioned pulleys being geared to one of the first-mentioned pulleys to cause said belts to move in unison, another of said pulleys for the upper belt being adjustable about an axis toward and from the lower belt, and relatively to the first-mentioned pulley for the same belt, and a pivoted hanger for said adjustable pulley.

5. In a machine of the character described, the combination with two pairs of contacting endless carriers, instrumentalities for gluing, elevating and folding the flaps of blanks carried by said carriers, of a single pair of contacting endless carriers arranged to engage the folded blanks in line with their overlapping flaps to press the same together, a single power shaft, and mechanism operated by said shaft for actuating all of said carriers.

6. In a machine of the character described, instrumentalities for carrying blanks and gluing and folding the flaps thereof, of pressing mechanism comprising two contacting endless carriers, pulleys supporting said carriers, and means for simultaneously adjusting said carriers and their pulleys laterally.

7. In a machine of the character described, the combination with a lower carrier comprising a pair of lower belts having upper horizontal stretches to engage a blank and means for actuating said belts, of an upper carrier comprising a pair of upper pressers extending partway of the length of the horizontal stretches of the lower belts and directly above the upper stretches of the lower belts, flap-elevating inclines arranged adjacent the outside edge. of said belts, folding belts beyond the upper belts to fold down upon the lower belts the flaps of the blanks which are elevated by said inclines, and pressing shoes extending from the upper pressers to the folding belts, said pressers, belts, and shoes being laterally adjustable to accommodate blanks of greatly varying widths.

8. In a machine of the character described, the combination of a lower carrier, flap folding belts, a horizontal pulley for each of said belts lying across said lower carrier, an adjustable pulley for the other end of each belt, and an intermediate guide for the acting stretch of each belt, said intermediate guides being located close to the lower carrier to hold the portions of the belts which are between them and the horizontal pulleys substantially parallel with said carrier, and the adjustable pulleys being variable to different positions to change the angles of those portions of the belts which are between them and the said intermediate guides relatively to said lower carrier.

9. In a machine of the character described, the combination with means for feeding a series of detached blanks in succession, of two lower endless carrier-belts, two upper endless carrier-belts, the adjacent stretches of said upper and lower belts contacting so as to engage each blank on two separated lines to hold it from twisting, pulleys supporting said belts, means for adjusting said belts and pulleys toward and from each other to accommodate blanks of different widths, means for positively causing the contacting stretches of said belts to move in unison in the same direction and with the same rate of speed, the lower belts projecting beyond the upper belts, means arranged by the sides of the upper and lower belts for elevating the flaps of the blanks, and means beyond the upper belts for folding down said flaps.

10. In a machine of the character described, the combination with two lower belts and two upper movable pressers superimposed upon and parallel with portions of said lower belts, each lower belt and the upper presser above it being laterally adjustable relatively to the other belt, of means for causing the coöperative surfaces of said belts and pressers to move in the same direction and with the same rate of speed, flap-elevating inclines placed adjustably beyond the outer edges of said belts, and laterally adjustable folding belts arranged to overlap portions of said lower belts to fold down the flaps of a blank elevated by said inclines.

11. In a machine of the character described, the combination with two lower belts and two upper movable pressers superimposed upon and parallel with portions of said lower belts, each lower belt and the upper presser above it being laterally adjustable relatively to the other belts, of means for causing the coöperative surfaces of said belts and pressers to move in the same direction and with the same rate of speed, flap-elevating inclines placed adjustably beyond the outer edges of said belts, laterally adjustable folding belts arranged to overlap portions of said lower belts to fold down the flaps of a blank elevated by said inclines, and a laterally adjustable shoe placed above a lower belt between the coöperative upper presser and folding belt for holding a blank on the lower belt until said blank is engaged by said folding belts.

In testimony whereof I have affixed my signature, in presence of two witnesses.

ELIE W. LABOMBARDE.

Witnesses:
RALPH E. FLANDERS,
JOSEPH DUFOUR.